United States Patent
Homma

(10) Patent No.: US 7,315,795 B2
(45) Date of Patent: Jan. 1, 2008

(54) PERFORMANCE ANALYZING METHOD USING HARDWARE

(75) Inventor: Ichiki Homma, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/037,226

(22) Filed: Jan. 19, 2005

(65) Prior Publication Data
US 2005/0283339 A1 Dec. 22, 2005

(30) Foreign Application Priority Data
Jun. 18, 2004 (JP) ............................. 2004-180434

(51) Int. Cl.
G06F 11/30 (2006.01)
G06F 9/44 (2006.01)
(52) U.S. Cl. ...................... 702/182; 717/127
(58) Field of Classification Search ........ 702/182–186; 714/20, 47; 717/127, 130, 131
See application file for complete search history.

(56) References Cited

U.S. PATENT DOCUMENTS

| 5,506,955 | A | * | 4/1996 | Chen et al. ................ 714/26 |
| 5,539,907 | A | * | 7/1996 | Srivastava et al. ........... 717/130 |
| 5,768,500 | A | | 6/1998 | Agrawal et al. |
| 5,896,538 | A | * | 4/1999 | Blandy et al. ............... 717/127 |
| 5,970,439 | A | * | 10/1999 | Levine et al. ................ 702/186 |
| 6,374,367 | B1 | * | 4/2002 | Dean et al. .................... 714/37 |
| 6,405,327 | B1 | * | 6/2002 | Sipple et al. ................. 714/39 |
| 6,885,641 | B1 | * | 4/2005 | Chan et al. .................. 370/252 |
| 2005/0027858 | A1 | * | 2/2005 | Sloth et al. ................. 709/224 |
| 2006/0004865 | A1 | * | 1/2006 | Theurer .................... 707/104.1 |

FOREIGN PATENT DOCUMENTS

JP 06-266585 9/1994

* cited by examiner

Primary Examiner—John Barlow
Assistant Examiner—Toan M. Le
(74) Attorney, Agent, or Firm—Antonelli, Terry, Stout & Kraus, LLP.

(57) ABSTRACT

A performance analyzing method for an information processing system includes a logic called "hardware monitor" for CPU performance profiling, CPU performance information collectable by the monitor, a CPU performance information collecting program to collect the information, transaction performance information collectable by an application program, and a calculation procedure to calculate performance analysis information such as a dynamic step count using the CPU performance information and the transaction performance information. Therefore, the performance analysis information can be collected while reducing the operation to count the number of source code lines of an application program or the operation to obtain the execution count of each macro code.

13 Claims, 4 Drawing Sheets

FIG.4

| TIME | DYNAMIC STEP COUNT | TRANSACTION TIME PER UNIT | MIPS VALUE | CPU UTILIZATION RATIO | TRANSACTION THROUGHPUT | ... |
|---|---|---|---|---|---|---|
| $T_0$ | $D_0$ | $E_0$ | $M_0$ | $B_0$ | $P_0$ | |
| $T_1$ | $D_1$ | $E_1$ | $M_1$ | $B_1$ | $P_1$ | ... |
| $T_2$ | $D_2$ | $E_2$ | $M_2$ | $B_2$ | $P_2$ | |
| ⋮ | ⋮ | ⋮ | ⋮ | ⋮ | ⋮ | |
| $T_n$ | $D_n$ | $E_n$ | $M_n$ | $B_n$ | $P_n$ | ... |
| ⋮ | ⋮ | ⋮ | ⋮ | ⋮ | ⋮ | |
| 410 | 411 | 412 | 413 | 414 | 415 | |

FIG.5

| TIME | DYNAMIC STEP COUNT | TRANSACTION TIME PER UNIT | MIPS VALUE | CPU UTILIZATION RATIO | TRANSACTION THROUGHPUT | ... |
|---|---|---|---|---|---|---|
| $T_0 \sim T_n$ | $D_a$ | $E_a$ | $M_a$ | $B_a$ | $P_a$ | ... |
| 510 | 511 | 512 | 513 | 514 | 515 | |

| TIME | DYNAMIC STEP COUNT | TRANSACTION TIME PER UNIT | MIPS VALUE | CPU UTILIZATION RATIO | TRANSACTION THROUGHPUT | ... |
|------|-------------------|---------------------------|------------|----------------------|------------------------|-----|
| $T_n$ | $D_n$ | $E_n$ | $M_n$ | $B_n$ | $P_n$ | ... |
| 610 | 611 | 612 | 613 | 614 | 615 | |

600

PERFORMANCE ANALYZING METHOD USING HARDWARE

INCORPORATION BY REFERENCE

The present application claims priority from Japanese application JP 2004-180434 filed on Jun. 18, 2004, the content of which is hereby incorporated by reference into this application.

BACKGROUND OF THE INVENTION

The present invention relates to performance analysis of an information processing system and software, and in particular, to a performance analyzing method in which performance per transaction unit is measured and compared, a system for achieving the same, and a program for implementing the same.

To improve transaction performance of an information processing system and software, it is important that present transaction performance thereof is measured and analyzed to determine bottleneck factors in the improvement of the transaction performance. An index to measure the transaction performance is a dynamic step count indicating the number of instructions executed per transaction unit by the information processing system or transaction time per unit indicating a period of time required for the information processing system to execute processing for each transaction unit.

To obtain the dynamic step count or the transaction time per unit of an application program, there can be considered a method in which the number of source code lines of an assembly language is counted by a human to calculate the dynamic step count by estimating an execution order at execution of the application program, and then the transaction time per unit is calculated using transaction performance of a central processing unit (CPU) to execute the application program.

Additionally, there exists a method as described in JP-A-6-266585 in which by modifying a source code of an application program, the number of executed transactions of each macro code is measured in the application program. In this method, the dynamic step count of each macro code and the transaction time per unit thereof are beforehand estimated using the method in which the number of source code lines of an assembly language is counted by a human as described above. The dynamic step count or the transaction time per unit of the application program is then calculated by combining the dynamic step count and the transaction time per unit of each macro code with the result of the number of executed transactions of the macro code measured in the method.

SUMMARY OF THE INVENTION

However, as described above, these methods are attended with the following problems.
(1) Even when the source code of an application program as an object of performance evaluation is not at hand, it is desirable that the number of source code lines in an assembly language can be counted.
(2) Even when the source code of the application program or the application program itself cannot be modified for some reason, for example, because the application program is already being executed in a customer site and hence cannot be replaced, it is desirable that the number of executed transactions of the macro code can be measured.
(3) Since the dynamic step count and the transaction time per unit are calculated according to the number of executed transactions of the macro code in this method, it is required to beforehand calculate the number of source code lines for each macro code.

It is therefore an object of the present invention to provide a technique in which performance analysis information such as the dynamic step count or the transaction time per unit is calculated in an information processing system or an application program as an object of performance evaluation in an easier way, for example, without counting the number of source code lines of the application program and without modifying the application program.

To achieve the object according to the present invention, the performance analysis information is calculated using a logic called "hardware monitor" incorporated in a processing unit (to be referred to as CPU hereinbelow) for CPU performance profiling.

More specifically, there are employed a "hardware monitor" function, CPU performance information collectable by use of the hardware monitor and a CPU performance information collecting program to collect the CPU performance information, transaction performance information collectable by an application program, and a calculation procedure to calculate performance analysis information such as the dynamic step count or the transaction time per unit according to the CPU performance information and the performance analysis information.

According to the present invention, the performance analysis can be more easily conducted.

BRIEF DESCRIPTION OF THE DRAWINGS

FIG. 4 is a diagram showing an example of a layout of performance analysis information obtained by the calculation procedure in the performance analyzing method of FIG. 1 and a display format thereof.

FIG. 5 is a diagram showing another example of a layout of performance analysis information obtained by the calculation procedure in the performance analyzing method of FIG. 1 and a display format thereof.

DESCRIPTION OF THE EMBODIMENTS

Figure 1:
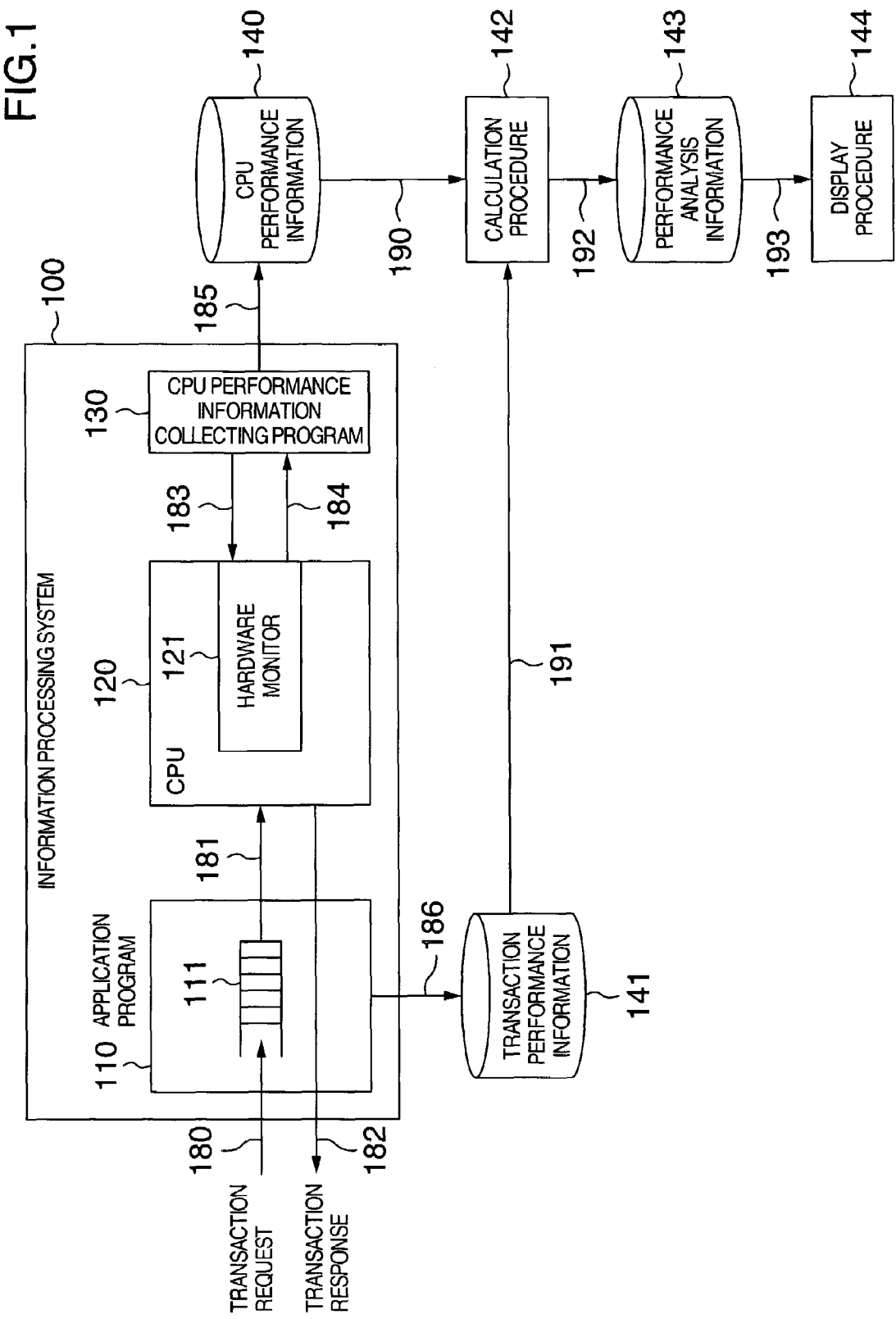
FIG. 1 is a block diagram showing a method of conducting performance analysis of an application program and an information processing system in an embodiment of a performance analyzing method according to the present invention.

FIG. 1 shows an embodiment of the present invention.

In FIG. 1, numeral 100 indicates an information processing system, a numeral 110 is an application program to be executed in the system 100, and numeral 120 is a CPU mounted in the system 100. Two or more application programs and two or more CPUs may be installed in the information processing system 100.

The CPU 120 includes a special logic unit called a hardware monitor 121 for CPU performance profiling. The hardware monitor 121 provides a CPU performance profiling function, described in, for example, U.S. Pat. No. 5,768,500, to collect CPU performance information without interrupting processing of the CPU. The CPU performance information shows information on performance of a CPU itself, such as number of executed instructions, at an information processing operation. The CPU performance information is detected by the hardware monitor 121. The hardware monitor 121 has a function to collect CPU performance information, for example, the number of executed instructions or the number of processing cycles in the processing.

Using the hardware monitor 121, the information processing system 100 executes a CPU performance information collecting program 130. The program 130 controls the hardware monitor 121 to collect CPU performance information. The program 130 may be independent of the application program 110 or may be configured to be united with the application program 110.

On the other hand, the application program 110 has a function to collect transaction performance information regarding execution thereof. The transaction performance information shows information on a transaction performance of a device, i.e. hardware, software, computer system on the like. The information is determined by measuring a time necessary for completing a processing through a test software prepared for such a measurement. In the configuration, the information is collected when each processing passes through a job assignment queue 111 disposed in the application program 110.

The configuration also includes storages 140 and 141 to respectively store the CPU performance information collected by the program 130 and the transaction performance information collected by the application program 110. The storages 140 and 141 may be independent of each other or may be configured as a united storage. Moreover, the storages 140 and 141 may be installed in the system 100 or outside the system 100.

There is also included a calculation procedure 142 to calculate performance analysis information using the CPU performance information and the transaction performance information respectively stored in the storages 140 and 141. The performance analysis information shows information on an execution performance of a device, i.e. hardware, software, computer system or the like, such as information on relationships among functions used in the system, information on an amount of loading of a certain function, information on execution time, information on cache missing ratio or the like. The procedure 142 may be executed by the system 100 or by an information processing system other than the system 100. The procedure 142 may be united with the program 110 or 130.

The configuration further includes a storage 143 to store the performance analysis information obtained by the procedure 142. The storage 143 may be installed in the system 100 or outside the system 100. There is also included a display procedure 144 to display the performance analysis information stored in the storage 143. The display procedure 144 may be executed by the system 100 or by an information processing system other than the system 100. The procedure 144 may be united with the program 110, 130, or 142.

Next, description will be given of an example of the method of collecting the performance analysis information in the embodiment.

In the processing of the application program 111, the processing is subdivided into a plurality of transaction units. Each unit is supplied as a transaction request from an external device to the program 110. After the processing is completely terminated, a transaction response is returned to an external device. A transaction request 180 is once held for each transaction unit, for example, in the job assignment queue 111. After the processing is terminated, a transaction response 182 is returned.

The CPU 120 executes processing for each unit on one hand, the program 130 controls the hardware monitor 121 for the CPU performance information to be measured, the start of measurement, and the end of measurement to thereby collect the CPU performance information. Specifically, the program 130 issues a CPU performance information collecting request 183 to the hardware monitor 121 to notify the monitor 121 that target CPU performance information items such as the number of executed instructions, the number of processing cycles, and the cache hit count are to be measured during a period of time from time T0 to time T1. In response to the request 183, the monitor 121 collects the CPU performance information items and then returns results of the measurement to the program 130 using a CPU performance information collection response 184.

The program 130 stores the CPU performance information in the storage 140 by CPU performance information storing 185.

Figure 2:
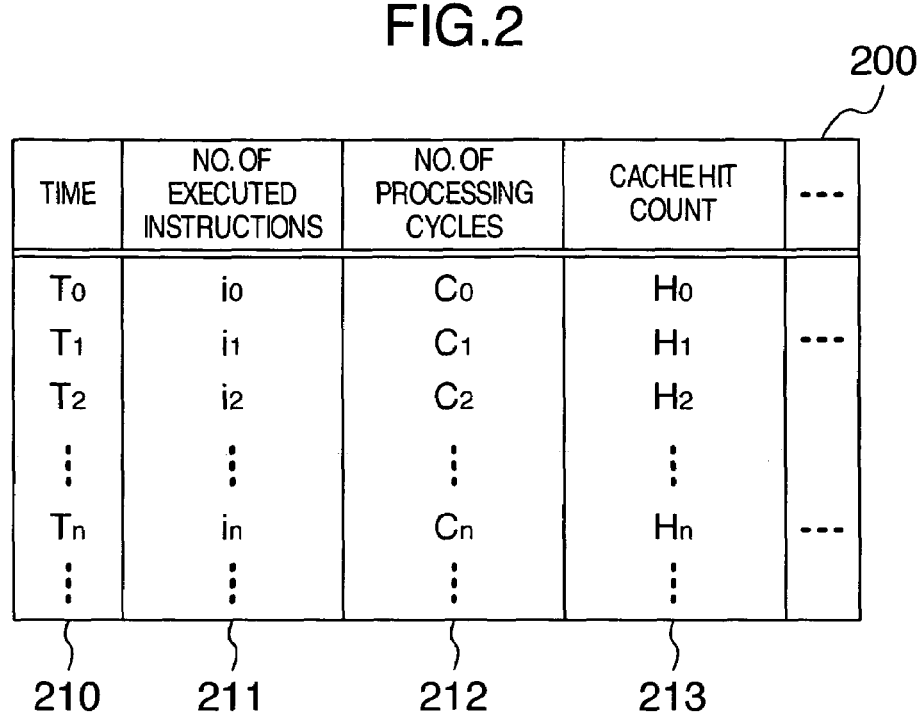
FIG. 2 is a diagram showing an example of a format of CPU performance information collected by a CPU performance information collecting program in the performance analyzing method of FIG. 1.

FIG. 2 shows an example of a format of the CPU performance information stored in the storage 140.

Numeral 200 indicates a table to store the CPU performance information. The table 200 includes entries each of which includes items such as an associated point of time (timing) 210, the number of executed transactions 211, the number of processing cycles 212, and a cache hit count 213.

At each timing, the CPU performance information items are recorded in the associated fields. For example, in the entry of a field 210 of time T0, the number of executed transactions i0, i.e., the number of instructions executed by the CPU 120 during a period of time from T0 to T1 is recorded in a field 211, the number C0 of cycles required to process the instructions executed by the CPU 120 is recorded in a field 212, the cache hit count H0 of cache hits occurred in the CPU 120 is recorded in a field 213.

The CPU performance information items are similarly recorded at each timing, and the fields are added to the table 200 each time the program 130 collects new CPU performance information items.

While the program 130 collects the CPU performance information, the transaction performance information is also collected. The transaction performance information is obtained by, for example, counting the transaction units having passed through the job assignment queue 111. Or, the information may also be collected by counting the CPU dispatch requests 181 supplied to the CPU 121 and the transaction responses 182 having passed through the application program 110.

Although the program 110 executed in the information processing system 100 collects the transaction performance information in the embodiment, it is also possible to use a method in which, for example, a program other than the program 110 counts the transaction requests 180, the CPU dispatch requests 181, or the transaction responses 182 to collect the transaction performance information.

The transaction performance information collected in the above method is stored in the storage 141 by transaction performance information storing 186.

Figure 3:
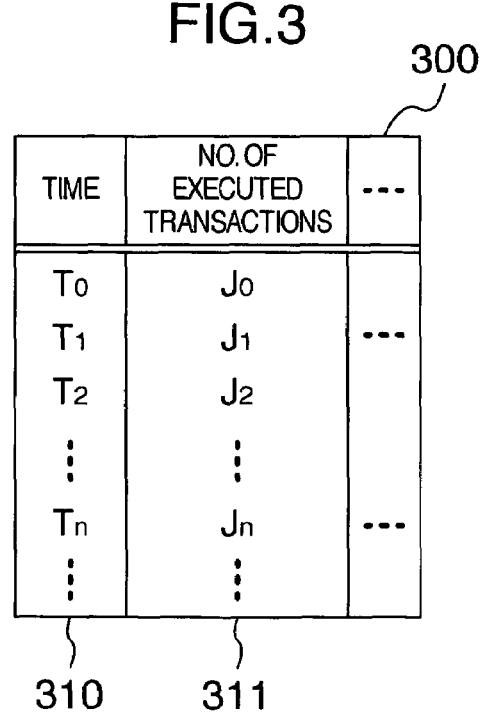
FIG. 3 is a diagram showing an example of a layout of transaction performance information collected by an application program in the performance analyzing method of FIG. 1.

FIG. 3 shows an example of a format of the transaction performance information stored in the storage 141.

Numeral 300 indicates a table to store the transaction performance information. The table 300 includes entries each of which includes items such as an associated point of time (timing) 310 and the number of executed transactions 311.

At each timing, the transaction performance information items are recorded in the associated fields. For example, in the entry of a field 310 of time T0, the number of executed transactions j0, i.e., the number of instructions executed by the program 110 during a period of time from T0 to T1 is recorded in a field 311. The transaction performance information items are similarly recorded at each timing, and the fields are added to the table 300 each time the program 110 collects new transaction performance information items.

Using the information items 140 and 141 obtained as above, the calculation procedure 142 calculates the performance analysis information items such as the dynamic step count or the transaction time per unit.

Concretely, the calculation procedure 142 fetches CPU performance information items and transaction performance information items required to calculate target performance analysis information items, using operations 190 and 191. Since the information items to be fetched are only items required to calculate the target performance analysis information items, it is not necessary to use all information items stored in the storages 140 and 141.

It is assumed in the embodiment that the CPU performance information items and the transaction performance information items thus collected are once stored respectively in the storages 140 and 141. However, without using the storages 140 and 141, the calculation procedure 142 may directly fetch the CPU performance information items and the transaction performance information items respectively from the programs 130 and 110.

Using the information items fetched as above, the procedure 142 calculates the performance analysis information, for example, in a calculation method, which will be described later, and stores the information in the storage 143 using an operation 192.

FIG. 4 shows an example of a format of the performance analysis information stored in the storage 143. Numeral 400 indicates a table to store the performance analysis information. The table 400 includes entries each of which includes items such as an associated point of time (timing) 410, the dynamic step count 411, the transaction time per unit 412, a value of million instructions per second (MIPS) 413, a CPU utilization ratio 414, and a transaction throughput 415.

At each timing, the performance analysis information items are recorded in the associated fields. For example, in the entry of a field 410 of time T0, the dynamic step count D0 during a period of time from T0 to T1 is recorded in a field 411, the dynamic step count E0 is recorded in a field 412, the MIPS value M0 indicating the number of instructions which can be executed by the CPU 120 per unit time is recorded in a field 413, the CPU utilization ratio B0 indicating utilization of the CPU per unit time is recorded in a field 414, and the transaction throughput P0 indicating the number of transactions executable per unit time is recorded in a field 415.

The performance analysis information items are similarly recorded at each timing, and the fields are added to the table 400 each time the calculation procedure 142 calculates new performance analysis information items.

Each item is calculated, for example, in a method described below.

The dynamic step count D0 during a period of time from T0 to T1 is calculated, for example, as follows. The number of executed instructions i0 as CPU performance information collected during the same term is fetched from the field 211 of the table 200 and the number of executed transactions J0 as transaction performance information collected during the same term is fetched from the field 311 of the table 300 to calculate D0=i0/J0. A result of the calculation is stored in an associated field 411 of the table 400.

Similarly, the dynamic step count E0 during a period of time from T0 to T1 is calculated, for example, as follows. The number of processing cycles C0 as CPU performance information collected during the same term is fetched from the field 212 of the table 200 and the number of executed transactions J0 as transaction performance information collected during the same term is fetched from the field 311 of the table 300 to calculate E0=C0/J0. Although E0 is calculated as the number of processing cycles in the CPU 120 in the method, the value may be represented using an actual period of time expressed using the clock frequency of the CPU 120.

Similarly, the MIPS value M0 during a period of time from T0 to T1 is calculated, for example, as follows. The number of executed instructions i0 as CPU performance information collected during the same term is fetched from the field 211 of the table 200 and the number of processing cycles C0 is fetched from the field 212 of the table 200. Using these items and the clock frequency F separately obtained, M0=i0*F/C0 is calculated. To express the result in the unit of one million (mega (M)), the value M0 may be divided by 1000000.

Similarly, the CPU utilization ratio B0 during a period of time from T0 to T1 is calculated, for example, as follows. The number of processing cycles C0 collected during the same term is fetched from the field 212 of the table 200. Using the item and the clock frequency F separately obtained, B0=C0/F/(T1-T0) is calculated. To express the result in the unit of percent, the value B0 may be multiplied by 100.

Similarly, the transaction throughput P0 during a period of time from T0 to T1 is calculated, for example, as follows. The number of executed transactions J0 as transaction performance information collected during the same term is fetched from the field 311 of the table 300 to calculate P0=J0/(T1-T0).

FIG. 5 shows an example of another format of the performance analysis information stored in the storage 143.

Numeral 500 indicates a table to store the performance analysis information. The table 300 includes entries each of which includes items such as an associated period of time 510, the dynamic step count 511, the transaction time per unit 512, the MIPS value 513, and the transaction throughput 515. For each period of time, the performance analysis information items are recorded in the associated fields. For example, in the entry of a field 510 of the period of time T0 to Tn (n is a natural number, which applies to the description below), an average dynamic step count Da during a period of time from T0 to Tn is recorded in a field 511, an average transaction time per unit Ea is recorded in a field 512, an average MIPS value Ba is recorded in a field 514, and an average transaction throughput Pa is recorded in a field 515.

The performance analysis information items are similarly recorded at each timing, and the fields are added to the table 500 each time the calculation procedure 142 calculates new transaction performance information items.

Each item is calculated, for example, in a method described below. The average dynamic step count Da during a period of time from T0 to Tn is calculated, for example, as follows. The numbers of executed instructions i0 to in-1 as CPU performance information collected during the same term are fetched from the field 211 of the table 200 and the numbers of executed transactions J0 to Jn-1 as transaction performance information collected during the same term are fetched from the field 311 of the table 300 to calculate Da=(sum of i0 to in-1)/(sum of J0 to Jn-1). A result of the calculation is stored in an associated field 411 of the table 400.

Similarly, the average dynamic step count Ea during a period of time from T0 to Tn is calculated, for example, as follows. The numbers of processing cycles C0 to Cn-1 as CPU performance information collected during the same term are fetched from the field 212 of the table 200 and the numbers of executed transactions J0 to Jn-1 as transaction performance information collected during the same term are fetched from the field 311 of the table 300 to calculate Ea=(sum of C0 to Cn-1)/(sum of J0 to Jn-1). Although E0 is calculated as the number of processing cycles in the CPU 120 in the method, the value may be represented in terms of an actual period of time expressed using the clock frequency of the CPU 120.

Similarly, the average MIPS value Ma during a period of time from T0 to Tn is calculated, for example, as follows. The numbers of executed instructions i0 to in-1 as CPU performance information collected during the same term are fetched from the field 211 of the table 200 and the numbers of processing cycles C0 to Cn-1 are fetched from the field 212 of the table 200. Using these items and the clock frequency F separately obtained, Ma=(sum of i0 to in-1\*F/(sum of C0 to Cn-1) is calculated. To express the result in the unit of one million (mega (M)), the value Ma may be divided by 1000000.

Similarly, the average CPU utilization ratio Ba during a period of time from T0 to Tn is calculated, for example, as follows. The numbers of processing cycles C0 to Cn-1 collected during the same term are fetched from the field 212 of the table 200. Using the item and the clock frequency F separately obtained, Ba=(sum of C0 to Cn-1)/F/(Tn−T0) is calculated. To express the result of Ba in the unit of percent, the value Ba may be multiplied by 100.

Similarly, the average transaction throughput Pa during a period of time from T0 to Tn is calculated, for example, as follows. The numbers of executed transactions J0 to Jn-1 as transaction performance information collected during the same term are fetched from the field 311 of the table 300 to calculate Pa=(sum of J0 to Jn-1)/(Tn−T0).

The display procedure 144 can display the performance analysis information stored in the storage 143 in the above method.

Specifically, the procedure 144 fetches performance analysis information items to be displayed from the storage 143 using an operation 193, arranges and shapes the fetched items according to a predetermined format, and then displays the resultant information items. However, it is not required to display all information items stored in the storage 143.

Figures 6, 7:
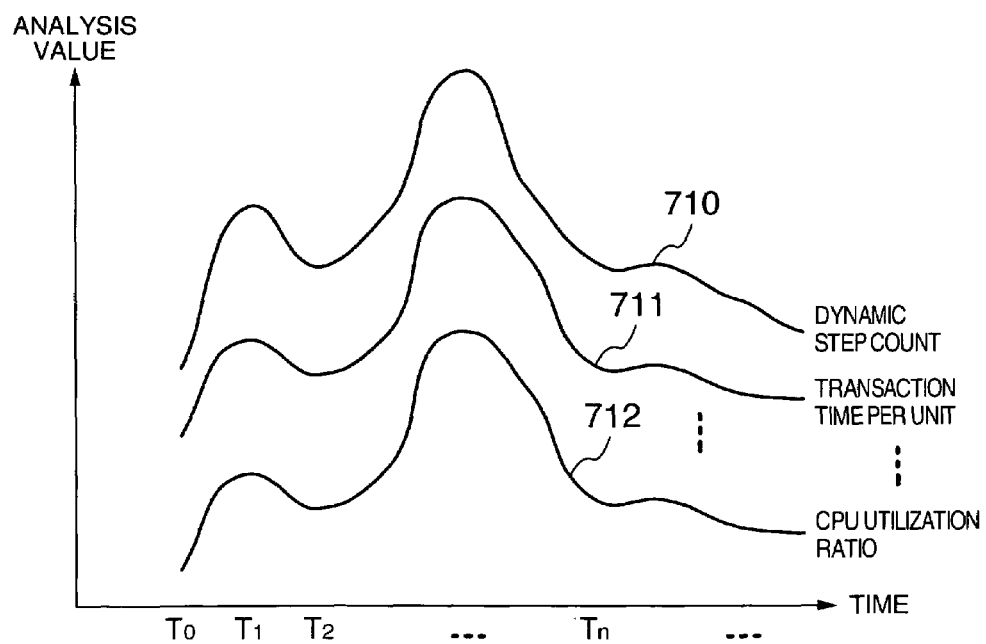
FIG. 6 is a diagram showing another example of a display format of performance analysis information obtained by the calculation procedure in the performance analyzing method of FIG. 1.
FIG. 7 is a graph showing an example of a format of the performance analysis information displayed in a graph by a display procedure in the performance analyzing method of FIG. 1.

Various display formats are available. For example, the respective items of the performance analysis information at each timing are displayed in a chronological order in a table as shown in FIG. 4 or the respective items of average values of the performance analysis information during each term are displayed in a table as shown in FIG. 5. There can be considered another display format to display items of the performance analysis information at a predetermined point of time as shown in FIG. 6. In still another format, there can be considered a graph as shown in FIG. 7. For each item of the performance analysis information, the values thereof at predetermined points of time are plotted in the graph in which the abscissa represents time and the ordinate represents values of the associated performance analysis information item.

According to the embodiment described above, it is not required to record the execution count for each macro code; moreover, it is not required to count the number of source code lines. Therefore, it is possible to provide a method of appropriately collecting performance analysis information such as the dynamic step count and the transaction time per unit without modifying an application program to record the macro execution count and without checking the source code lines of the application program.

Although the dynamic step count and the transaction time per unit are used as performance analysis information items in the description of the embodiments, it is obvious that other performance analysis information items can also be used as below. By changing the CPU performance analysis information items collected by the hardware monitor 121 and the CPU performance information collecting program 130, there can be used a cache missing ratio per transaction as a performance index of storage devices of the information processing system 100 and the CPU 120 or a value of floating operations per second (FLOPS) per transaction as a performance index of a floating-point execution unit of the CPU 120. Additionally, the CPU performance information and the transaction performance information are used to calculate the performance analysis information in the description of the embodiments. However, when it is desired to calculate, for example, only the performance analysis information items such as the MIPS value and the CPU utilization ratio which do not depend on the transaction performance information, it is obvious that the target information items can be obtained by collecting only the CPU performance information.

In the prior art, each time an application program to be executed by the information processing system is changed, it is required to count the number of source code lines in an assembly language for the application program or it is required to conduct modification of the source code of the application program to measure the execution count of each macro code in the application program. In the method of the present invention, in contrast with the prior art, the performance analysis information items such as the dynamic step count and the transaction time per unit are collected using a logic called "hardware monitor" incorporated in the CPU for the CPU performance profiling, CPU performance information collectable using the hardware monitor, and a CPU performance information collecting program to collect the information. This leads to advantages of the present invention. That is, the application program to be executed by the information processing system can be arbitrarily replaced and the performance analysis information items such as the MIPS value and the CPU utilization ratio which cannot be collected in the prior art can be collected.

Although the dynamic step count and the transaction time per unit of an application program are calculated in the description of the embodiments, since information items such as the MIPS value, the CPU utilization ratio, and the transaction throughput are collectable, it can be considered that the present invention is applicable also to a performance monitoring device to monitor performance of an information processing system, an application program, or a CPU.

According to the performance analysis information collectable by the embodiments, the present invention is also applicable to a performance index of an information processing system, an application program, or a CPU.

By predicting or calculating maximum transaction performance of an information processing system or a CPU according to the performance analysis information collectable by the embodiments, it can be considered that the present invention is also applicable to a unit to calculate an optimal size of the information processing system or to a unit to predict and to calculate an optimal number of CPUs in the information processing system.

By obtaining, according to the performance analysis information collectable by the embodiments, the performance analysis information of each of mutually different information processing systems or CPUs, it can be considered that the present invention is also applicable, by comparing the information, to a unit to predict and to calculate transaction performance when a processing program is executed by the mutually different information processing systems or CPUs.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A performance analyzing method for performance analysis of an information processing system and an application program of measuring and comparing performance per transaction unit of the application program, comprising the steps of:
   collecting CPU performance information using a logic for CPU performance profiling, the logic being a hardware monitor incorporated in a central processing unit (CPU) of the information processing system;
   collecting transaction performance information of an application program to be executed by the information processing system;
   calculating performance analysis information including a dynamic step count or a transaction time using the CPU performance information and the transaction performance information; and
   displaying data regarding the performance analysis information including the dynamic step count or the transaction time which have been collected;
   wherein the performance analyzing method is conducted without modifying the application program.

2. A performance analyzing method according to claim 1, wherein:
   the step of collecting the CPU performance information includes the step of collecting CPU performance information of each of a plurality of information processing systems; and
   the step of collecting the performance analysis information includes the step of collecting performance analysis information of each of a plurality of the information processing systems, the method further comprising
   the step of comparing the performance analysis information with each other.

3. A performance analyzing method according to claim 2, further comprising the step of predicting, using a result of the step of comparing the performance analysis information, performance when the plural information processing system executes predetermined information processing.

4. A performance analyzing method according to claim 1, wherein the application program being embedded in a computer-readable medium.

5. A performance analyzing apparatus for performance analysis of an information processing system and an application program for measuring and comparing performance per transaction unit of the application program, comprising:
   means for collecting CPU performance information using a logic for CPU performance profiling, the logic being a hardware monitor incorporated in a central processing unit (CPU) of the information processing system;
   means for collecting transaction performance information of an application program to be executed by the information processing system;
   means for calculating performance analysis information including a dynamic step count or a transaction time using the CPU performance information and the transaction performance information; and
   means for displaying data regarding the performance analysis information including the dynamic step count or the transaction time which have been collected;
   wherein the performance analyzing apparatus conducts performance analysis without modifying the application program.

6. A performance analyzing apparatus according to claim 5, wherein:
   the means for collecting the CPU performance information includes means for collecting CPU performance information of each of a plurality of information processing systems; and
   the means for collecting the performance analysis information includes means for collecting performance analysis information of each of a plurality of the information processing systems, the apparatus further comprising
   means for comparing the performance analysis information with each other.

7. A performance analyzing apparatus according to claim 6, further comprising means for predicting, using a result from the means for comparing the performance analysis information, performance when the plural information processing system executes predetermined information processing.

8. A performance analyzing apparatus according to claim 5, wherein the application program being embedded in a computer-readable medium.

9. A performance analyzing method for performance analysis of an information processing system and an application program of measuring and comparing performance per transaction unit of the application program, comprising the steps of:
   collecting CPU performance information using a logic for CPU performance profiling, the logic being a hardware monitor incorporated in a central processing unit (CPU) of the information processing system;
   collecting transaction performance information of an application program to be executed by the information processing system;
   calculating performance analysis information including a dynamic step count or a transaction time using the CPU performance information and the transaction performance information; and displaying data regarding the performance analysis information including the dynamic step count or the transaction time which have been collected.

10. A performance analyzing method according to claim 9, wherein the application program being embedded in a computer-readable medium.

11. A performance analyzing apparatus for performance analysis of an information processing system and an application program for measuring and comparing performance per transaction unit of the application program, comprising:
 means for collecting CPU performance information using a logic for CPU performance profiling, the logic being a hardware monitor incorporated in a central processing unit (CPU) of the information processing system;
 means for collecting transaction performance information of an application program to be executed by the information processing system;
 means for calculating performance analysis information including a dynamic step count or a transaction time using the CPU performance information and the transaction performance information; and,
 means for displaying data regarding the performance analysis information including the dynamic step count or the transaction time which have been collected.

12. A performance analyzing apparatus according to claim 11, wherein the CPU performance information includes number of executed instructions.

13. A performance analyzing apparatus according to claim 11, wherein the application program being embedded in a computer-readable medium.

* * * * *